(12) United States Patent
Smallwood et al.

(10) Patent No.: US 6,944,256 B2
(45) Date of Patent: Sep. 13, 2005

(54) OPTIMIZING USE OF STATISTICS COUNTERS

(75) Inventors: Mark A. L. Smallwood, Beaconsfield (GB); Michael J. Clarke, Oxford (GB); Mark A. French, Amersham (GB); Martin R. Lea, Chalfont St. Peter (GB)

(73) Assignee: Alcatel IP Networks, Inc., Plano, TX (US)

( * ) Notice: Subject to any disclaimer, the term of this patent is extended or adjusted under 35 U.S.C. 154(b) by 0 days.

(21) Appl. No.: 10/830,822

(22) Filed: Apr. 23, 2004

(65) Prior Publication Data

US 2004/0213370 A1 Oct. 28, 2004

Related U.S. Application Data

(60) Provisional application No. 60/465,653, filed on Apr. 25, 2003.

(51) Int. Cl.[7] .................................................. G06M 3/08
(52) U.S. Cl. .............................. 377/13; 377/14; 377/26; 377/51
(58) Field of Search ............................... 377/26, 13, 51, 377/14

(56) References Cited

U.S. PATENT DOCUMENTS 6,421,408 B1 * 7/2002 Nagarakanti et al. .......... 377/26
6,449,214 B1 * 9/2002 Carr et al. ................... 365/236

* cited by examiner

*Primary Examiner*—Margaret R. Wambach
(74) *Attorney, Agent, or Firm*—Van Pelt, Yi & James LLP

(57) ABSTRACT

Optimizing statistics counter use is disclosed. A total number of counter bits to be used to track two or more statistics is determined. The total number of counter bits is allocated among the two or more statistics to provide for each statistic a counter comprising the number of bits allocated for that statistic, the allocation being such that each counter overflows at a rate desired for that counter. The overflow rates may be balanced, such that each counter overflows at approximately the same rate.

21 Claims, 2 Drawing Sheets

OPTIMIZING USE OF STATISTICS COUNTERS

CROSS REFERENCE TO RELATED APPLICATIONS

This application claims priority to U.S. Provisional Patent Application No. 60/465,653 entitled MANAGING NETWORK PACKET PROCESSOR AND NETWORK TRAFFIC MANAGER INTERACTIONS Apr. 25, 2003 which is incorporated herein by reference for all purposes.

FIELD OF THE INVENTION

The present invention relates generally to statistics counters. More specifically, optimizing use of statistics counters is disclosed.

BACKGROUND OF THE INVENTION

Statistics counters may be used anywhere it may be necessary or advantageous to measure or record a count or rate. In network processing, for example, statistics counters are used to track traffic flows. Traffic flows may be measured any number of ways, e.g., by a frame count or rate, a corresponding octet count or rate, or some other measure. Network traffic flows for 10 gigabit Ethernet can be as high as 15 million frames per second and 1250 million bytes per second. If statistics counters of the same size were used to record, e.g., a frame count and a byte count, the two counters would overflow at different rates. Prior to overflow, a statistics counter must be "polled" (i.e., the count read). Therefore, if two or more counters overflow at different rates, the counter(s) that overflow more quickly would have to be polled more often, requiring unequal polling resources by the network processor and, for the counters requiring faster polling, much more processing resource. It would be better to configure a statistics counter so that polling would be more equal and therefore processing resources more equal.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
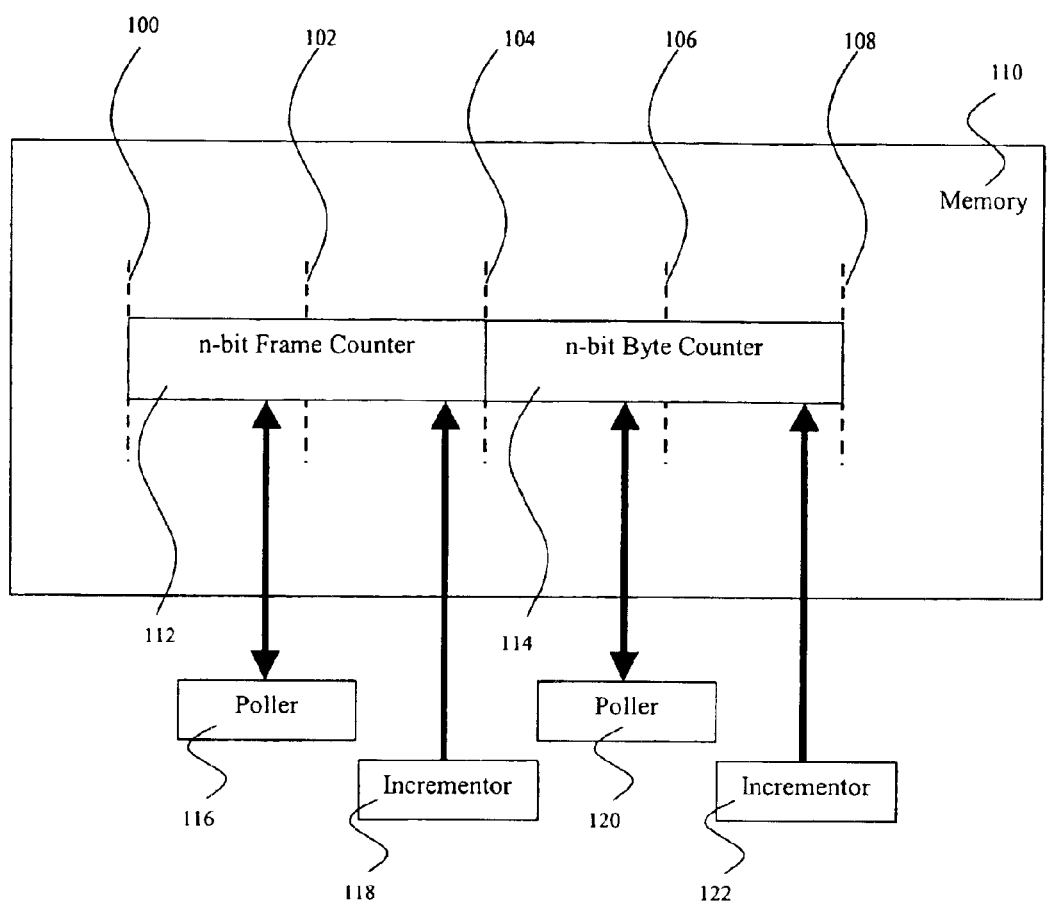
FIG. 1 is a block diagram illustrating a statistics counter architecture in a network processor.

FIG. 1 is a block diagram illustrating a statistics counter architecture used in one embodiment to store statistics associated with a network switch. Incrementor 118 increases the value in n-bit frame counter 112 each time a frame is counted. Incrementor 122 increases the value in n-bit byte counter 114 each time a byte is counted. In this example, each of the counters is described as comprising an n-bit counter, but in other cases the size of the frame and byte counters, respectively, may be different. However, in a typical prior art architecture, the size of the statistics counters is limited, e.g., by the way in which the memory in which the statistics counters reside is configured and/or organized. The counters 112 and 114 are memory locations in memory 110. Memories are organized and accessible in fixed sized units. These fixed sized units are typically 8-bits, 16-bits, or 32-bits in size. The counters 112 and 114 are aligned so that they begin and end on a boundary of these fixed sized units. Counter 112 begins on boundary 100 and ends on boundary 104. Counter 112 can span one or more boundaries; as an example, counter 112 is shown spanning one boundary 102. Counter 114 begins on boundary 104 and ends on boundary 108. Counter 114 can span one or more boundaries; as an example, counter 114 is shown spanning one boundary 106. In some embodiments, the counters are not adjacent to one another in the memory. In a typical configuration, e.g., each of the counters 112 and 114 may be a 32-bit counter. Techniques are known to extend a 32-bit counter to comprise a 48-bit counter, but those techniques are not efficient and do not scale well. Similarly, overflow time for a rapidly incremented statistic can be extended by using a 64-bit counter, but that solution obviously uses twice the counter resources as a 32-bit counter and typically only a limited number of counters are available.

Poller 116 periodically checks the frame counter 112 to see the number of frames counted. Poller 120 likewise checks the byte counter 114 to see the number of bytes counted. Poller 116 needs to check counter 112 before it overflows to get an accurate frame count. Poller 120 needs to check counter 114 before it overflows to get an accurate byte count. For a 10 Gigabit Ethernet channel, e.g., the peak frame rate is ~15 million frames per second and the peak byte rate is 1250 million bytes per second (because each frame comprises more than one byte). For a counter size of 32 bits for the frame counter 112 (n=32), the counter would overflow every 286 seconds. If the byte counter 114 were also a 32 bit counter, the counter would overflow every 3.4 seconds. The byte counter in this example would need to be polled ~80 times more often than the frame counter and would therefore use more processor resources. The very high polling frequency required for the byte counter 114 in this example would consume excessive processing (e.g., CPU) resources. As noted above, the size of the byte counter could be expanded to 48 bits or 64 bits, but that would require the use of all or part of an additional 32-bit counter, which is not optimal.

Figure 2:
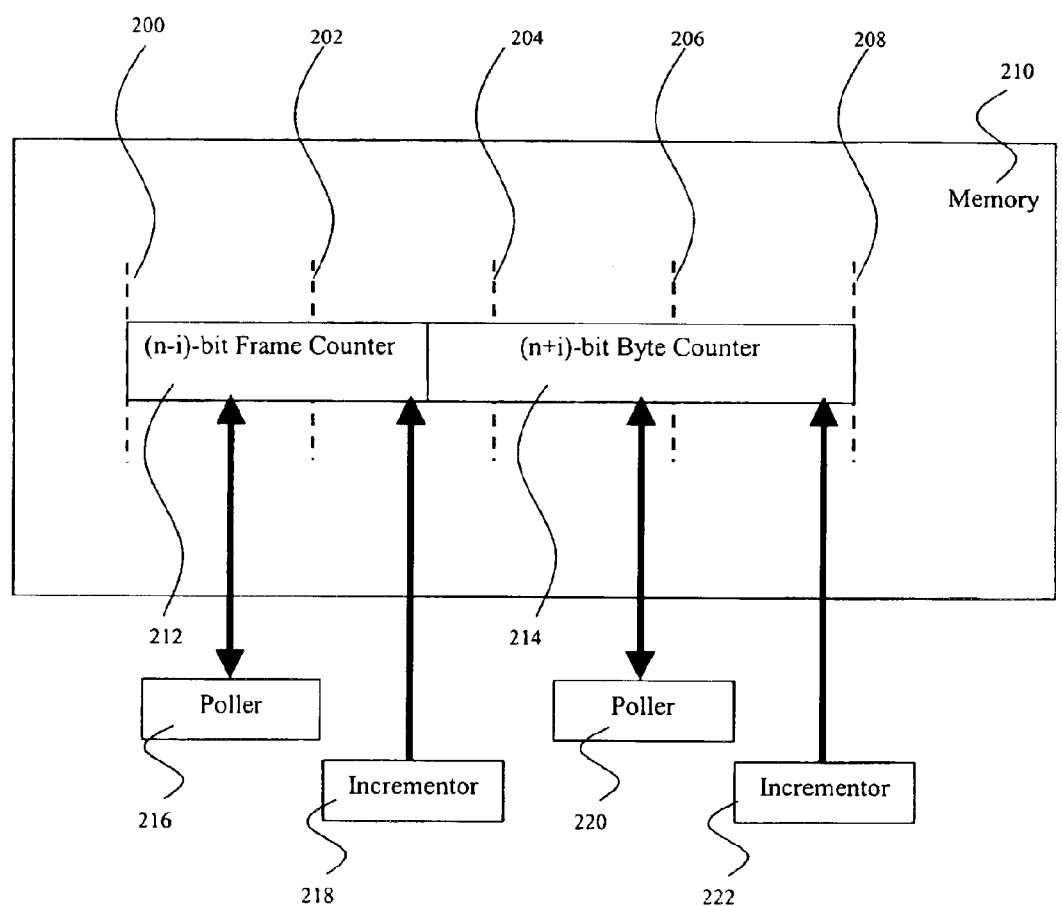
FIG. 2 is a block diagram illustrating an alternate statistics counter architecture in a network processor.

FIG. 2 is a block diagram illustrating an alternate statistics counter architecture used in one embodiment. The frame counter 212 and byte counter 214 of FIG. 2 together use the same 2 n-bit counters used by frame counter 112 and byte counter 114 of FIG. 1. However, i bits of the n-bit counter used to provide the frame counter 214 are now being used as an additional i bits for the byte counter 214. The additional bits are shifted in this example from the frame counter to the byte counter because the byte counter increments at a faster rate than the frame counter. By making the byte counter larger at the expense of the frame counter, the overflow rates can be balanced, as described more fully below. Incrementor 218 increases the value in (n−i)-bit frame counter 212 each time a frame is counted. Incrementor 222 increases the value in (n+i)-bit byte counter 214 each time a byte is counted. The counters 212 and 214 are memory locations in memory 210. Memories are organized and accessible in fixed sized units. These fixed sized units are typically 8-bits, 16-bits, or 32-bits in size. The counters 212 and 214 are aligned so that they do not necessarily begin and end on a boundary of these fixed sized units. Counter 212 begins on boundary 200 and but does not necessarily end on boundary 202 or 204. Counter 212 can span one or more boundaries; as an example, counter 212 is shown spanning one boundary 202. Counter 214 does not begin on boundary 202, 204, or 206 and ends on boundary 208. Counter 214 can span one or more boundaries; as an example, counter 214 is shown spanning two boundaries 204 and 206. In some embodiments, the counters are not adjacent to one another in the memory.

Poller 216 checks the (n−i)-bit frame counter 212 to see the number of frames counted. Poller 220 checks the (n+i)-bit byte counter 214 to see the number of bytes counted. Poller 216 needs to check counter 212 before it overflows to get an accurate frame count. Poller 220 needs to check counter 214 before it overflows to get an accurate byte count. For a 10 Gigabit Ethernet channel, the peak frame rate is ~15 million frames per second and the byte rate is 1250 million bytes per second. Assuming the original statistics counters were 32-bit counters (i.e., n=32, the two counters together comprising a 64-bit counter) and three bits were shifted from the frame counter to the byte counter (i.e., i=3), for a counter size of 29 bits for the frame counter 212, the counter would overflow every 26 seconds (2^29 bits/15e6 frames/second=25.79 seconds). For a counter size of 35 bits for the byte counter 214, the counter would overflow every 27 seconds (2^35 bits/1.25e9 bytes/second=27.48 seconds). The extended byte counter 214 needs to be polled about as often as the frame counter 212 and would therefore use about the same processor resources, and the polling rate for the byte counter has been decreased substantially without using to provide the frame counter and byte counter more than the two 32-bit counters used in the example shown in FIG. 1.

In some embodiments, the size of the frame counter and the byte counter can always be chosen by examining the frame rate and the byte rate. More generally, the respective size of a first counter and a second counter provided by splitting a 2n-bit counter (or 2 n-bit counters) unevenly in order to balance the overflow rate and hence the polling rate of the two counters may be determined by examining the respective rates at which the two counters will be incremented. For example, assume that a 2n-bit counter (or two n-bit counters, e.g.) is to be used to provide a first counter that increments at a rate R1 and a second counter that increments at a rate R2. The overflow rate, and hence the required overflow rate, is given by the buffer size in bits divided by the rate at which the counter is expected to be incremented. Assuming the first counter has the lower rate (i.e., R1<R2), the overflow period of the first counter would be given by 2^(n−i)/R1, assuming a positive value for i, and the overflow period of the second counter would be given by 2^(n+i)/R2.

Setting the overflow periods to be equal yields:

$$\frac{2^{(n-i)}}{R1} = \frac{2^{(n+i)}}{R2}$$

which reduces to:

$i = \frac{1}{2} \log_2 (R2/R1)$

In some embodiments, the number of bits shifted to use by the higher rate counter is the nearest integer of ½ log$_2$ (R2/R1). In the example shown in FIG. 2, the split is determined by i=½ log$_2$1250/15=3.2, with the result that three bits are shifted from the frame counter to the byte counter, such that the frame counter becomes 32−3=29 bits in size and the byte counter comprises 32+3=35 bits.

If a single counter is to be split to provide two counters, as opposed to two counters being divided unevenly, the split could be determined by dividing the total number of bits t in the counter to provide a first counter of size r and a second counter of size s, such that s+r=t, as follows:

$$\frac{2^r}{R1} = \frac{2^s}{R2}$$

which is the same as:

$$\frac{2^{(t-s)}}{R1} = \frac{2^s}{R2}$$

which reduces to s=t/2+½ log$_2$ (R2/R1), such that the size of the larger counter would be the nearest integer to t/2+½ log$_2$ (R2/R1) and the size of the smaller (lower rate) counter would be the total t minus the size of the larger (or, the nearest integer to t−½ log$_2$ (R2/R1)).

Applying the above to splitting a single 64-bit statistic counter to provide a frame counter and a byte counter as described above would yield the same result, i.e., a 35-bit byte counter and a 29-bit frame counter.

While certain of the embodiments described above use packet frame and byte counters as examples, the approach described herein may be used in any case where it may be necessary or desirable to configured a single statistic counter or group of counters of a prescribed and/or limited size to provide two or more counters of unequal size that have balanced overflow rates. Also, while the examples above show two counters being provided, the same principles can be applied to providing any number of counters by using one or more bits from a first counter to store additional bits for one or more other counters so as to balance (or at least make more balanced) the respective overflow periods and/or polling rates of the counters. In addition, while the examples described in detail above result in the respective overflow periods of two or more counters being balanced, in other embodiments one or more bits may be shifted from use by a first counter to provide additional bits for use by a second counter to extend the overflow period of the second counter to a level that satisfies one or more applicable performance criteria, system limitations, etc., even if the overflow periods of the respective counters are not the same.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for optimizing use of statistics counters comprising:

determining a total number of counter bits to be used to track two or more statistics; and allocating the total number of counter bits among the two or more statistics to provide for each statistic a counter comprising the number of bits allocated for that statistic, the allocation being such that each counter overflows at a rate desired for that counter.

2. The method of claim 1 wherein determining a total number of counter bits to be used comprises determining the size of a standard-sized statistic counter and determining how many standard-sized statistics counters will be used to track said two or more statistics.

3. The method of claim 1 wherein allocating the total number of counter bits comprises balancing the respective overflow periods of the counters, such that each overflows in about the same period as the others.

4. The method of claim 3 wherein said two or more statistics comprise a first statistic expected to be incremented at a first rate and a second statistic expected to be incremented at a second rate that is faster than the first rate and balancing the respective overflow periods comprises allocating to the counter for the second statistic a number of bits that is k bits larger than a number of bits allocated to the counter for the first statistic, where k is equal to the integer nearest to $\log_2$(second rate/first rate).

5. The method of claim 3 wherein said two or more statistics comprise a first statistic expected to be incremented at a first rate and a second statistic expected to be incremented at a second rate that is faster than the first rate and balancing the respective overflow periods comprises allocating to the counter for the second statistic, from the total number of counter bits "t" to be used, a number of bits equal to the integer nearest to the quantity $(t/2+\frac{1}{2} \log_2(\text{second rate/first rate}))$.

6. The method of claim 1 wherein the two or more statistics comprise statistics associated with a network switch.

7. The method of claim 6 wherein the two or more statistics comprise a frame count and a byte count.

8. A system for optimizing use of statistics counters comprising:

a statistics counter split so as to provide a counter for each of two or more statistics, wherein the statistics counter comprises a total number of counter bits and the total number of counter bits are allocated among the two or more statistics to provide for each statistic a counter comprising the number of bits allocated for that statistic, the allocation being such that each counter overflows at a rate determined for that counter; and for each of said two or more statistics an incrementor configured to increment the counter for that statistic.

9. The system of claim 8 wherein the total number of counter bits is determined by determining the size of a standard-sized statistic counter and determining how many standard-sized statistics counters will be used to track said two or more statistics.

10. The system of claim 8 wherein the total number of counter bits are allocated by balancing the respective overflow periods of the counters, such that each overflows in about the same period as the others.

11. The system of claim 10 wherein said two or more statistics comprise a first statistic expected to be incremented at a first rate and a second statistic expected to be incremented at a second rate that is faster than the first rate and balancing the respective overflow periods comprises allocating to the counter for the second statistic a number of bits that is k bits larger than a number of bits allocated to the counter for the first statistic, where k is equal to the integer nearest to $\log_2$(second rate/first rate).

12. The system of claim 10 wherein said two or more statistics comprise a first statistic expected to be incremented at a first rate and a second statistic expected to be incremented at a second rate that is faster than the first rate and balancing the respective overflow periods comprises allocating to the counter for the second statistic, from the total number of counter bits "t" to be used, a number of bits equal to the integer nearest to the quantity $(t/2+\frac{1}{2} \log_2(\text{second rate/first rate}))$.

13. The system of claim 8 wherein the two or more statistics comprise statistics associated with a network switch.

14. The system of claim 13 wherein the two or more statistics comprise a frame count and a byte count.

15. A computer program product for optimizing use of statistics counters, the computer program product being embodied in a computer readable medium and comprising computer instructions for:

determining a total number of counter bits to be used to track two or more statistics; and allocating the total number of counter bits among the two or more statistics to provide for each statistic a counter comprising the number of bits allocated for that statistic, the allocation being such that no counter overflows in an unacceptably short period.

16. A computer program product as recited in claim 15 wherein determining a total number of counter bits to be used comprises determining the size of a standard-sized statistic counter and determining how many standard-sized statistics counters will be used to track said two or more statistics.

17. A computer program product as recited in claim 15 wherein allocating the total number of counter bits comprises balancing the respective overflow periods of the counters, such that each overflows in about the same period as the others.

18. A computer program product as recited in claim 17 wherein said two or more statistics comprise a first statistic expected to be incremented at a first rate and a second statistic expected to be incremented at a second rate that is faster than the first rate and balancing the respective overflow periods comprises allocating to the counter for the second statistic a number of bits that is k bits larger than a number of bits allocated to the counter for the first statistic, where k is equal to the integer nearest to $\log_2$(second rate/first rate).

19. A computer program product as recited in claim 17 wherein said two or more statistics comprise a first statistic expected to be incremented at a first rate and a second statistic expected to be incremented at a second rate that is faster than the first rate and balancing the respective overflow periods comprises allocating to the counter for the second statistic, from the total number of counter bits "t" to be used, a number of bits equal to the integer nearest to the quantity $(t/2+\frac{1}{2} \log_2(\text{second rate/first rate}))$.

20. A computer program product as recited in claim 15 wherein the two or more statistics comprise statistics associated with a network switch.

21. A computer program product as recited in claim 20 wherein the two or more statistics comprise a frame count and a byte count.

* * * * *

UNITED STATES PATENT AND TRADEMARK OFFICE
CERTIFICATE OF CORRECTION

PATENT NO.        : 6,944,256 B2
APPLICATION NO.   : 10/830822
DATED             : September 13, 2005
INVENTOR(S)       : Smallwood et al.

It is certified that error appears in the above-identified patent and that said Letters Patent is hereby corrected as shown below:

Claim 5
Column 5, line 38 delete "(t/2½ log2(second rate/first rate))." and insert
-- (t/2 + ½ log2(second rate/first rate)). --

Signed and Sealed this

Twenty-second Day of September, 2009

David J. Kappos
*Director of the United States Patent and Trademark Office*